UNITED STATES PATENT OFFICE.

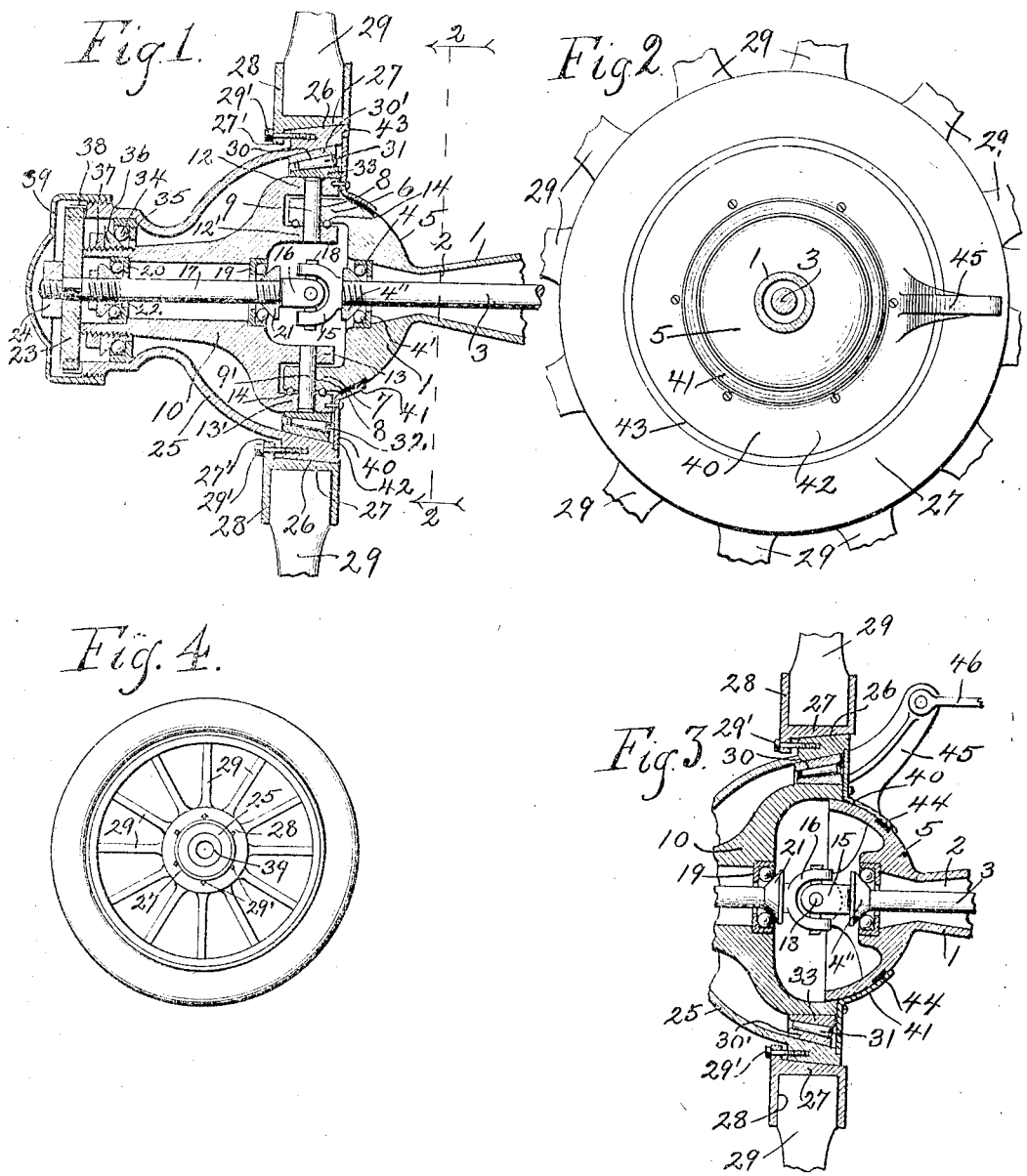

MARTIN L. WILLIAMS, OF SOUTH BEND, INDIANA.

VEHICLE-WHEEL.

No. 887,562.

Specification of Letters Patent.

Patented May 12, 1908.

Application filed December 26, 1905. Serial No. 293,291.

*To all whom it may concern:*

Be it known that I, MARTIN L. WILLIAMS, a citizen of the United States, residing at South Bend, in the county of St. Joseph and State of Indiana, have invented certain new and useful Improvements in Vehicle-Wheels, of which the following is a specification.

This invention relates to improvements in vehicle wheels, and refers more specifically to an improved steering wheel for automobiles.

Among the salient objects of the invention are to provide a construction in which the axis of oscillation of the wheel is coincident with the tread center of the wheel so that oscillatory movement of the wheel when the vehicle is stationary is unaccompanied by bodily movement of the wheel away from its point of rest; to provide an improved construction and arrangement of the parts whereby the propelling mechanism is in no wise disturbed by the change of position of the wheel upon its axis of oscillation; to provide a construction in which the terminal portion of the axle upon which the wheel is mounted is hemispherical or provided with a spherical surface concentric with the point of intersection of the axes of oscillation and rotation, and the wheel carries a guard which telescopes over or embraces said spherical portion and forms in conjunction with the latter a dust proof joint; to provide a construction in which the bearing which supports the chief weight is in the form of a roller bearing and in the plane of the spokes of the wheel; to provide an improved construction in which the outer portion of the wheel comprising the rim, spokes and sockets for the spokes, is made bodily removable from the hub portion; to provide a construction in which the weight of the axle and load carried thereby is transmitted to the wheel hub through sets of roller or ball bearings arranged concentric with the axis of oscillation of the wheel, thereby greatly reducing the frictional resistance to steering movement of the wheels; to provide improved details of construction and arrangement which enables the various bearing parts to be adjusted to compensate for wear and in such manner as to maintain the flexible drive shaft in the exact proper relation to the axis of oscillation of the wheel; and in general to provide an improved construction of the character referred to.

To the above ends the invention consists in the matters hereinafter described, and more particularly pointed out in the appended claims.

The invention will be readily understood from the following description, reference being had to the accompanying drawings, in which—

Figure 1 is a vertical axial sectional view of the hub portion and connected axle portion embodying the invention; Fig. 2 is a sectional view taken on line 2—2 of Fig. 1; Fig. 3 is an approximately axial sectional view taken horizontally through the wheel hub but in a plane just above the crank-arm 45; Fig. 4 is a side elevation of a complete wheel.

Referring to the drawings, 1 designates as a whole the terminal portion of a vehicle axle, which terminal portion may be formed integrally with the axle as shown, or attached thereto so as to form in effect a rigid extension thereof. Said extension is provided with an axial passage 2 through which is arranged to extend a drive shaft 3, confined axially within the extension by means of a set of roller bearings, designated as a whole 4, interposed between the parts. The exterior of the extension is semispherical, as indicated at 5, and at its upper and lower sides is provided with ear-like extensions 6 and 7 arranged in vertical alinement with each other, and vertical apertures, as indicated at 8, for the reception of pivot bolts 9 and 9'.

10 designates as a whole a spindle member, which takes the form of a hollow tapered casting or forging having an axial passage 11, and provided at its base or inner end with two pairs of ears, as 12, 12' and 13, 13', which are arranged to embrace the corresponding ears of the axle extension. The ears of the spindle member are similarly apertured to receive the pivot bolts 9 and 9' which serve to unite the parts in such manner that the wheel as a whole may oscillate upon a vertical axis. In order to minimize the friction between the parts during such oscillatory movement, sets of ball bearings 14 are interposed between the lower sides of the ears of the extension member and underlying ears of the spindle member; the ears being suitably grooved to form races for the balls.

The outer end of the drive shaft 3 terminates in a yoke 15 forming one member of a knuckle joint; the coöperating member being a similar yoke 16 formed upon the end of a spindle shaft 17 arranged to extend axially through the spindle member 10. The members 15 and 16 of the knuckle joint are united with each other by the usual union member 18, having radius pins or bearing studs arranged at right angles to each other and connected with the respective arms of the two yokes; it being noted that the center of oscillation of the union member is coincident with the vertical axis of oscillation of the wheel. The spindle shaft 17 is journaled and supported concentrically within the spindle member by means of suitable bearings arranged near the respective ends of the central passage of the spindle member. These bearings in the preferred construction shown take the form of angular race members 19 and 20 seated in suitable recesses in the spindle member and coöperating with cones 21 and 22 threaded upon the shaft 17. These cones are adjustably threaded on the shaft so that the exact position of the yoke carried by the shaft may be determined. Sets of balls are interposed between the cones and respective race members. The bearing, designated as a whole 4, and hereinbefore referred to, is similarly formed by means of an angular race member 4' seated in the extension of the member 1, and an adjustably mounted cone 4''; the usual set of balls being interposed between these members.

Upon the outer end of the spindle shaft 17 is fixed a clutch disk 23 which is secured in position by means of a check nut 24. 25 designates as a whole an outer shell forming in effect the hub proper or part which rotates about the spindle member. The base portion of the shell is exteriorly finished to form an annular seat 26 which tapers very slightly toward the outer end of the hub, and upon this seat is fitted a ring casting or member 27 having a series of sockets 28 formed therein to receive the set of spokes 29. The spoke ring 27 is conveniently secured upon this seat upon the hub shell by means of a series of tap screws 29' inserted through a flange 27' formed upon the spoke ring and into the hub shell, as shown clearly in the drawings.

Upon the interior of the hub shell, in register with the outer spoke ring, is provided a roller race or bearing surface 30, and between this race and the periphery of the spindle member is interposed a set of conical antifriction rollers 31, confined in proper relation to each other within a caging device, designated as a whole 32. The wearing surfaces or roller races upon the interior of the hub shell and exterior of the spindle member, respectively, are desirably formed by means of detachable wear rings, as indicated at 30', 33, respectively. The outer and smaller end of the hub shell is journaled upon the outer end portion of the spindle member, a set of ball bearings being to this end interposed between said parts, as indicated at 34. This set of ball bearings comprises an angular race member 35 seated in the shell, a cone 36 threaded upon the exterior of the spindle member and secured in adjusted position by means of a lock nut 37, and a set of balls interposed between the cone and race member. Upon the end margin of the shell is formed a series of clutch projections 38 which are adapted to engage the corresponding recesses of the clutch disk 23 hereinbefore described, whereby rotation is imparted to the traction wheel from the spindle shaft 17. The outer end of the hub shell is closed by means of a suitable cap 39.

In order that the inner end of the hub shell may be closed so as to prevent access of dust or dirt to the interior, a guard member 40 is secured to the spindle member, said guard being cast or forged and comprising a partispherical portion 41 which fits closely over the corresponding spherical part of the axle extension, and a radial portion 42 which is secured to the base end of the spindle casting 10 and at its periphery fits within a rabbet 43 formed in the end wall of the hub shell. In order to seal the joint between the spherical overlapping parts, a shallow recess is formed in the axle extension member within which is arranged a sheet of felt or other suitable packing, as indicated at 44.

In order to effect oscillatory movement of the wheel about its vertical axis, a rigid arm or extension 45 is provided at one side, which is connected rigidly with one side of the base portion of the spindle member 10 and extends in a direction approximately at right angles to the vertical axis of oscillation, and inwardly inside of the main plane of the wheel. This steering arm may be conveniently formed integrally with, or rigidly connected to, the guard member 40, which as hereinbefore described is rigid with the spindle member. With the free end of this arm is connected any suitable device for effecting the oscillation of the wheel, as for example a steering rod 46.

By reason of the fact that the wear ring 33 which encircles the spindle member overlies the ends of the pivot or radius pins 9 and 9', the latter are retained in position without the use of other fastening means; it being noted that the outer end of each radius pin is slightly headed and the spindle member correspondingly countersunk to receive the heads.

I claim as my invention:

1. The combination with a vehicle axle and a terminal yoke upon the latter, of a spindle member pivotally connected with said yoke to oscillate upon an axis substantially perpendicular to the longitudinal axis of the axle, a wheel journaled upon said spindle member and a guard mounted to move with said spindle member during the oscillatory movement of the latter and overlapping the contiguous portion of said yoke which supports the spindle member, the overlapping portion of said yoke guard being internally spherical and the exterior of the overlapped portion of the yoke of corresponding shape.

2. The combination with a vehicle axle and a terminal yoke upon the latter, of a spindle member pivotally connected with said yoke to oscillate upon an axis substantially perpendicular to the longitudinal axis of the axle, a wheel journaled upon said spindle member, a guard mounted upon the spindle member and having a parti-spherical zone-shaped part which overlaps the contiguous portion of the yoke, and a radially extending portion which extends in proximity to and forms a running joint with a part of the wheel mounted upon the spindle member.

3. The combination with a vehicle axle and a wheel-supporting member mounted thereon, and an exteriorly conical roller race ring extending circumferentially around said wheel-supporting member and detachably united to the latter, a hub member surrounding said supporting member and provided interiorly with a detachable race ring, said ring being conical as to its inner periphery and arranged concentric with said first ring, and a set of conical rollers interposed between said rings.

MARTIN L. WILLIAMS.

Witnesses:
EMILIE ROSE,
FRANK L. BELKNAP.